(12) United States Patent
Yan et al.

(10) Patent No.: US 7,678,847 B2
(45) Date of Patent: Mar. 16, 2010

(54) ENCAPSULATED STRUCTURAL ADHESIVE

(75) Inventors: Nianxi Yan, Appleton, WI (US); Peggy Dorothy Sands, Appleton, WI (US); Sandra Jacqueline Guinebretiere, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 791 days.

(21) Appl. No.: 11/451,833

(22) Filed: Jun. 13, 2006

(65) Prior Publication Data

US 2007/0021533 A1    Jan. 25, 2007

Related U.S. Application Data

(60) Provisional application No. 60/701,803, filed on Jul. 22, 2005.

(51) Int. Cl.
*C08K 9/10*    (2006.01)
*B32B 27/04*    (2006.01)

(52) U.S. Cl. ............... 523/200; 525/939; 525/922; 525/900; 428/343; 428/402.21; 523/210

(58) Field of Classification Search ............... 523/200, 523/210; 525/939, 922, 920; 428/402.21, 428/343
See application file for complete search history.

(56) References Cited

U.S. PATENT DOCUMENTS

| | | | |
|---|---|---|---|
| 3,425,988 A | 2/1969 | Gorman et al. | 260/47 |
| 3,429,827 A | 2/1969 | Ruus | 252/316 |
| 3,516,941 A | 6/1970 | Matson | 252/316 |
| 3,577,515 A | 5/1971 | Vandegaer | 424/32 |

(Continued)

OTHER PUBLICATIONS

Microencapsulation by James A. Herbig, Eneyclopedia of Chemical Technology, vol. 13, Second Edition, pp. 436-456.

*Primary Examiner*—Satya B Sastri
(74) *Attorney, Agent, or Firm*—Benjamin Mieliulis

(57) ABSTRACT

The invention teaches an encapsulated curable adhesive composition especially adapted for use as a structural adhesive. The adhesive composition enables formation of a thin layer reactive composition of microcapsules and a two-part curative. The adhesive composition comprises a first population of microcapsules encasing a monomer and a first-part curative comprising an initiator. The adhesive composition further comprises a second-part curative. The second-part curative comprises an activator and a catalyst. At least the activator of the second-part curative is preferably encapsulated in a second population of microcapsules. The catalyst and the second population of microcapsules can be dispersed in a binder material, along with the first population of microcapsules. The first population of microcapsules contain encapsulated within the core a monomer having a Tg 35° C. or less and the first-part curative. The first population microcapsules contain encapsulated within the core a monomer having a Tg 35° C. or less along with the first-part curative. The encapsulated monomer and first-part curative constitute a blend which is a free flowing liquid having a viscosity of less than 500 Cp (milliPascal-second), and more preferably less than 10 Cp (milliPascal-second). The first population of microcapsules with first-part curative, and a second-part curative and second population of microcapsules are dispersed in a binder material. Reactive contact of the monomer and first-part curative with the second-part curative is affected by exuding the respective capsule contents into reactive contact through breakage of the microcapsules such as an interference fit of the substrate or substrates to which the composition is applied.

21 Claims, 6 Drawing Sheets

U.S. PATENT DOCUMENTS

| | | | |
|---|---|---|---|
| 3,616,040 A | 10/1971 | Toback | 156/310 |
| 3,691,140 A | 9/1972 | Silver | 260/78.5 |
| 3,757,828 A | 9/1973 | Frauenglass et al. | 138/145 |
| 3,826,756 A * | 7/1974 | Bachmann et al. | 264/4.7 |
| 3,886,085 A | 5/1975 | Kiritani et al. | 252/316 |
| 3,965,033 A | 6/1976 | Matsukawa et al. | 252/316 |
| 3,993,815 A | 11/1976 | Douek et al. | 428/40 |
| 4,126,504 A | 11/1978 | Wolinski et al. | 156/310 |
| 4,140,516 A | 2/1979 | Scher | |
| 4,157,983 A | 6/1979 | Golden | 252/316 |
| 4,285,720 A | 8/1981 | Scher | 71/88 |
| 4,417,028 A | 11/1983 | Azevedo | 525/285 |
| 4,430,480 A * | 2/1984 | Melody et al. | 525/160 |
| 4,534,783 A | 8/1985 | Beestman | 71/27 |
| 4,552,811 A | 11/1985 | Brown et al. | 428/402.21 |
| 4,588,639 A * | 5/1986 | Ozono | 428/402.22 |
| 4,601,863 A | 7/1986 | Shioi et al. | 264/4.3 |
| 4,610,927 A | 9/1986 | Igarashi et al. | 428/402.21 |
| 4,632,944 A * | 12/1986 | Thompson | 522/11 |
| 4,721,748 A | 1/1988 | Iovine et al. | 524/460 |
| 4,729,696 A * | 3/1988 | Goto et al. | 405/259.6 |
| 4,808,639 A | 2/1989 | Chernack | 523/211 |
| 4,830,558 A | 5/1989 | Sweeney | 411/258 |
| 4,975,484 A | 12/1990 | Fryd et al. | 524/811 |
| 4,980,410 A | 12/1990 | Fryd et al. | 524/510 |
| 5,120,349 A | 6/1992 | Stewart et al. | 71/93 |
| 5,132,117 A | 7/1992 | Speaker et al. | 424/490 |
| 5,206,288 A | 4/1993 | Gosiewski et al. | 525/83 |
| 5,225,278 A | 7/1993 | Kielbania, Jr. et al. | 428/402.22 |
| 5,292,835 A | 3/1994 | Jahns et al. | 526/73 |
| 5,397,812 A * | 3/1995 | Usami et al. | 522/13 |
| 5,401,577 A | 3/1995 | Seitz | 428/402.21 |
| 5,407,609 A | 4/1995 | Tice et al. | 264/46 |
| 5,853,520 A | 12/1998 | Rich et al. | 156/293 |
| 5,922,798 A | 7/1999 | Roesch et al. | 524/360 |
| 5,959,002 A | 9/1999 | Kuramochi et al. | 523/176 |
| 6,113,935 A | 9/2000 | Rodson et al. | 424/408 |
| 6,375,872 B1 * | 4/2002 | Chao | 264/4.33 |
| 6,592,990 B2 * | 7/2003 | Schwantes | 428/402.21 |
| 2004/0166165 A1 | 8/2004 | Mistry et al. | |
| 2006/0011293 A1* | 1/2006 | Xia et al. | 156/307.1 |

* cited by examiner

△ --Catalyst

□ --Activator

ENCAPSULATED STRUCTURAL ADHESIVE

This application under 35 U.S.C. § 111(a) claims priority to provisional U.S. application Ser. No. 60/701,803 filed Jul. 22, 2005 and incorporated herein by reference.

BACKGROUND OF THE INVENTION

1. Field of the Invention

This invention relates to adhesive compositions wherein one or more of the reactive constituents are encapsulated. It more particularly relates to encapsulated compositions which upon fracture of the capsules enable commingling of internal and external constituents for reactive contact to form a high strength structural adhesive

2. Description of the Related Art

Douek et al. (U.S. Pat. No. 3,993,815) teaches anaerobic pressure sensitive adhesives formed from reaction of methacrylate esters with diisocyanates.

Douek's resins are combined with a thermoplastic polymer system of one or more high molecular weight polymers which constitutes the adhesive system. Douek provides the anaerobic pressure sensitive adhesive stocks in the form of sheets or tapes from which the adhesive layer can be transferred to a substrate to be bonded.

Azevedo (U.S. Pat. No. 4,417,028) teaches an improved polymerizable binder material compared to the prior art systems of polymerizable acrylate, peroxyinitiator, accelerator and aqueous polyvinyl alcohol binder systems of U.S. Pat. Nos. 3,814,156 and 3,489,599. Azevedo teaches a two part system with encapsulation of the free radical initiator as one part, and the monomer, binder and accelerator as a second part. Azevedo teaches improved binder systems based on replacing polyvinyl alcohols with anhydrides.

Gosiewski (U.S. Pat. No. 5,206,288) teaches an adhesive for low temperature applications involving combining methacrylate ester monomers with elastomeric polymers. The elastomeric compounds form up to 35 weight percent of the adhesive. The elastomeric polymers are selected to have a Tg below −25° C.

Other prior art systems involve solvent based adhesive systems. Roesch et al. (U.S. Pat. No. 5,922,798) teaches a solvent based adhesive system where a water insoluble polymer together with an organic solvent for the polymer is encapsulated and coated onto structures such as sections of plastic piping to join such sections using an interference fit to fracture the capsules releasing the solvent polymer adhesive.

While encapsulated adhesive systems have simplified end-use applications, such systems still have drawbacks limiting adaptation in many end use applications and environments.

With thin layer, dry-to-the-touch pre-applied adhesives, premature failure of the bond, or low bond strength has limited adoption in many industries especially for structural applications.

Degradation of the adhesive during storage prior to use has also been a concern.

Often times, to address concerns with premature failure, the thickness of the applied adhesive coatings is increased resulting in a need to provide latitude in tolerance in specifications to account for volumes and gaps to accommodate the glue loading levels. An adhesive system of high strength that could be pre-applied and activatable after drying would be of commercial interest. It would eliminate the need to handle fluids or wet materials during construction or assembly. Applied as a thin dry-to-the-touch coating would allow tighter product manufacturing tolerances and potentially reduce costs through more efficient utilization of materials and resources. Such an adhesive would facilitate ease of use and more convenient and rapid assembly of parts. A pre-applied dry-to-the-touch adhesive coating of high strength useful as a structural adhesive would be an advance in the art.

SUMMARY OF THE INVENTION

Figure 1:
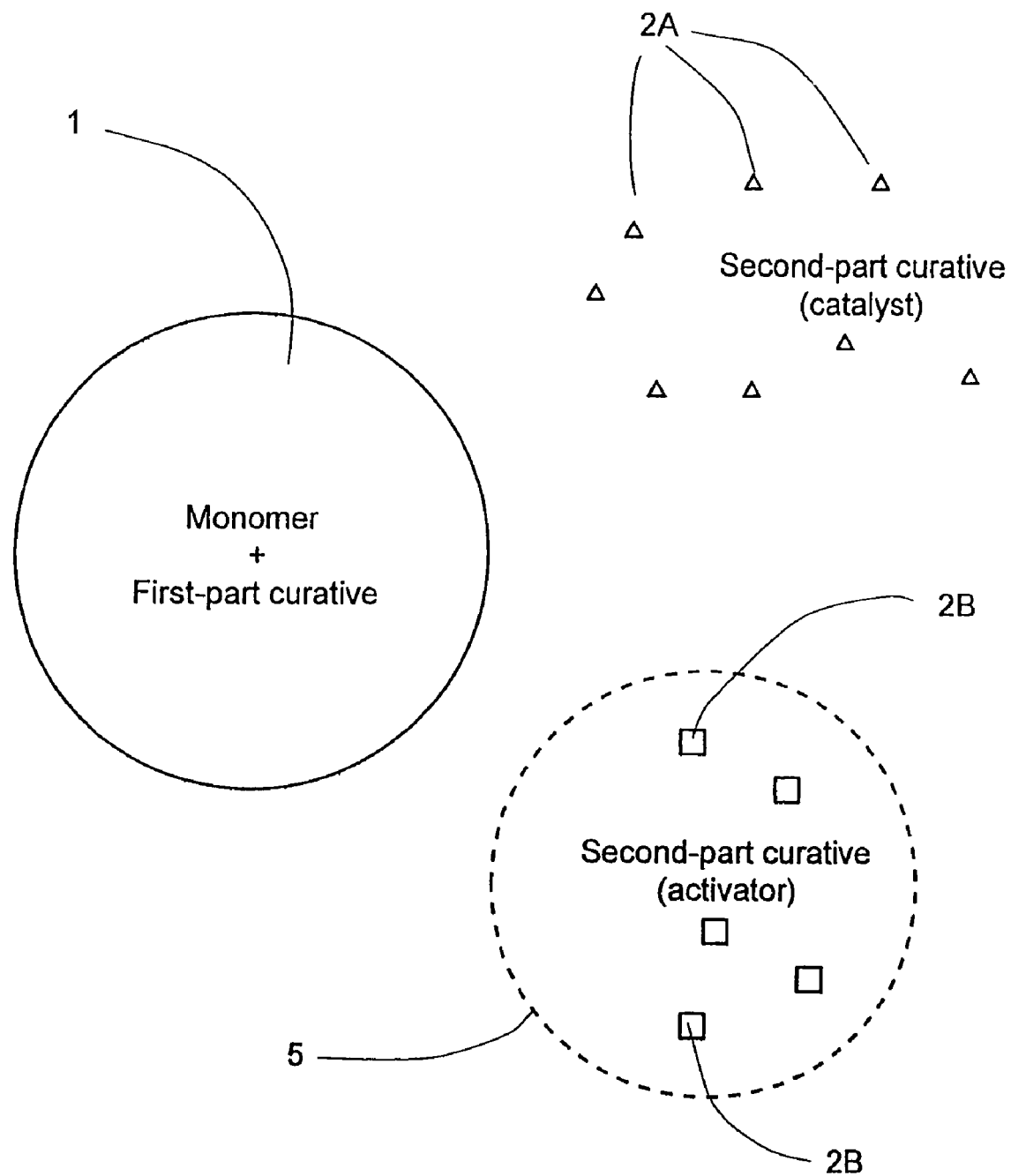
FIG. 1 is a schematic illustrating an embodiment of the invention showing a first-part curative and second-part curative.

The present invention teaches an improved adhesive composition especially suited for forming high strength dry-to-the-touch structural adhesives. The adhesive composition of the invention, in some embodiments, is a thin layer flowable adhesive providing a dry-to-the-touch adhesive providing high strength when joining interference fit components. At least one of the adhesive constituents flows into contact with the other constituents of the adhesive composition to form a high strength structural adhesive.

In a preferred embodiment a flowable monomer is encapsulated together with initiator. A flowable activator can be separately encapsulated or positioned in a binder material, matrix or carrier for the adhesive composition. For convenience herein, all such materials are referred to as binder or binders herein. Upon capsule rupture, the flowable components of monomer, initiator and activator flow into reactive contact with each other and a catalyst forming a high strength adhesive.

The present invention in various embodiments teaches an encapsulated curable adhesive composition comprising a two part curative. The curative consists substantially of a first-part curative of a preferably peroxy initiator, and a second-part curative. Other additives can also be present such as rheology modifiers, pigments, fragrances, odor-masking agents, fillers, colorants and plasticizers. A first population of polymeric microcapsules encases the initiator and monomer which is reactive with the second-part curative. The second-part curative is also of two parts or two components. The capsules encase both the first-part curative and the monomer thereby forming a monomer and initiator (first-part curative) blend. The polymeric microcapsules are substantially impermeable to both parts of the curative. The monomer is selected from flowable (meth)acrylate esters, epoxy (meth)acrylate and urethane (meth)acrylate esters. For convenience the term "(meth)acrylate" is to be understood as used herein and in the claims as referring to both the acrylate and methacrylate versions of the specified monomer. However, the encapsulated monomer and initiator blend is a free flowing liquid having a viscosity of less than 500 milliPascal-second (Cp) (Centipoise). For clarity, the viscosity of the encapsulated monomer and initiator blend refers to the viscosity of the monomer and initiator combined and forming the internal phase or core of the microcapsules. The viscosity is the viscosity of the capsule contents. The term "monomer" in the specification and claims should be understood as being defined for purposes hereof to include monomers and oligomers thereof and blends of monomers and oligomers provided the requisite viscosity parameters of the resultant blend are met. The monomer preferably has a Tg of 35° C. or less or is blended with monomers to have a resultant Tg of less than 35° C. The second-part curative comprises a catalyst and activator. The second-part curative is preferably external to the polymeric microcapsules containing monomer and initiator disposed on the substrate to be joined, or in a binder or carrier for the system, or on the outside of the microcapsules. The second-part curative is a catalyst and an activator. Alternatively, the activator of the second-part curative is separately encapsulated or positioned in a binder material, matrix or carrier for the adhesive composition. The catalyst is typically external to the microcapsules, and can be in the binder or carrier or applied as a first coating to a substrate which is over coated with the balance of the components of the structural adhesive. Optionally, the catalyst may be separately encapsulated or positioned in a binder material, matrix or carrier for the adhesive composition.

DETAILED DESCRIPTION

An encapsulated curable adhesive composition is taught for forming high strength structural adhesives. In the majority of embodiments, these structural adhesives are able to be fashioned as dry-to-the-touch coatings before activation.

The encapsulated curable adhesive composition comprises a two part curative comprised of a first-part curative and a second-part curative. The first-part curative is an initiator material. The second-part curative is a catalyst and an activator. The adhesive composition includes a first population of polymeric microcapsules encapsulating a monomer reactive with the two part curative when "complete," meaning that the initiator, catalyst and activator have all come together, enabling reactive contact. The internal contents or core of the first population of microcapsules includes a flowable monomer or monomers reactive with the two part curative. Prior to encapsulation, the monomer is blended with the first-part curative forming a blend of the monomer and initiator. This blend of monomer and first-part curative forms the core of the first population of microcapsules. The second-part curative comprises catalyst preferably a water soluble catalyst such as a copper metal salt, and an activator. A binder material is also provided to retain the population of microcapsules and two-part curative in proximity such as when coated on a substrate to be joined. Preferably the activator is separately encapsulated forming a second population of microcapsules.

The monomer is preferably selected from difunctional acrylates, methacrylate esters, epoxyacrylate esters, epoxyacrylates, urethane acrylate esters, and melamine acrylate monomers and oligomers. More preferably the monomer is a difunctional methacrylate ester or difunctional urethane acrylate ester. Blends of any of the foregoing are possible.

Blends of difunctional methacrylate esters together with monofunctional acrylate esters are also particularly useful.

The monomer and the initiator blend is selected to be a free flowing liquid, meaning a viscosity of less than 500 centipoise. The monomer and initiator blend has a viscosity of less than 500 centipoise (Cp), (at room temperature 25° C. unless otherwise indicated). Centipoise is equivalent to milliPascal-second units (milliPascal-second). Viscosity parameters herein are understood as measured at 25° C. unless otherwise indicated. Similarly, the activator is preferably separately encapsulated and also selected to be a free flowing liquid.

Preferably the viscosity of the monomer is less than 100, and even more preferably less than about 7 Cp (milliPascal-second); and the viscosity of the monomer and initiator blend is preferably less than 25 Cp, and more preferably less than 10 Cp.

Most preferably the viscosity of the monomer and initiator blend is less than 5 Cp (milliPascal-second). A convenient way to measure viscosity is by use of a viscometer such as Brookfield, Model LVF.

The aspect of achieving a free flowing liquid of the monomer (or monomers) and initiator which forms the internal phase or core of the first population of microcapsules can be accomplished by blending monomers of high viscosity with from 0 to 99 weight percent a lower viscosity monomer. For illustration, melamine acrylate having a viscosity of 1500 Cp can be blended or in essence, diluted, with tetrahydrofurfuryl (meth)acrylate and hexanediol dimethacrylate (viscosity <15 Cp) in sufficient weight percent or ratio to achieve a blend with the initiator that is well below 500 Cp (milliPascal-second) making the blend useful as a free flowing liquid in the invention. The useful ratios of such blends to achieve the desirable viscosity of less than 500 Cp can be readily ascertained by the skilled artisan by blending different proportions of viscous and non-viscous monomers.

Similarly the activator is selected to be a free flowing liquid, and preferably has a viscosity of less than 500 Cp at room temperature, and more preferably less than 100 Cp, and most preferably less than 10 Cp.

The monomer or blend of monomers is selected to have a Tg of 35° C. or less, more preferably less than 25° C., and most preferably less than 10° C. In certain applications a Tg of 1° C. or less is preferable. Similar to the technique for blending high viscosity monomers with lower viscosity monomers, blending of high Tg monomers with lower Tg monomers can also be done to achieve a resultant Tg for the monomer blend of 35° C. or less. Table 1 lists a variety of monomers along with their Tg values and viscosity. Table 1 lists a variety of monomers available from commercial suppliers such as Satomer (Exton, Pa.) and others. Various monomers and oligomers are available commercially that either have the requisite viscosity and Tg values, or which can be blended together to achieve the requisite viscosity and Tg.

TABLE 1

| Monomer | Tg C | Mw | viscosity Cps 25° C. or milliPascal-second |
|---|---|---|---|
| 2-phenoxyethyl acrylate | 5 | 192 | 12 |
| tridecyl acrylate | −55 | 255 | 7 |
| difunctional aliphatic urethane acrylate | | | 3000@60 C. |
| urethane diacrylate oligomer | −37 | | 9975@60 C. |
| urethane diacrylate oligomer | | | 660@60 C. |
| 1.6 hexanediol diacrylate | 43 | 226 | 9 |
| ethoxylated (4) bisphenol diacrylate | 60 | 512 | 1080 |
| caprolactone acrylate | −53 | 344 | 80 |
| urethane dimethacrylate | 25 | | 1740@60 C. |

TABLE 1-continued

| Monomer | TgC | Mw | viscosity cps 25 C. |
|---|---|---|---|
| trimethylolpropane trimethacrylate | 27 | 338 | 44 |
| tetrahydrofurfuryl methacrylate | 23 | 170 | 5 |
| tetrahydrofurfuryl acrylate | −15 | 156 | 6 |
| tripropylene glycol diacrylate | 62 | 300 | 15 |
| 1,6 hexanediol dimethacrylate | 30 | 254 | 8 |
| polyethyleneglycol dimethacrylate | | 330 | 15 |
| 1,3 butylene glycol dimethacrylate | 29 | 226 | 8 |
| ethoxylated (2) bisphenol A dimethacrylate | | 452 | 1082 |
| ethoxylated (10) bisphenol A dimethacrylate | −1 | 808 | 410 |
| caprolactone modified neopentylglycol hydroxypivalate diacrylate | | 540 | 70-140 |
| caprolactone modified neopentylglycol hydroxypivalate diacrylate | | 768 | 200-300 |
| melamine acrylate | | | 1500 |
| aromatique polyether urethane diacrylate oligomer | −40 | | 3195@60 C. |
| TMPTA trimethylolpropane triacrylate | 62 | 296 | 106 |
| isodecyl acrylate | −60 | 212 | 5 |
| caprolactone acrylate | −53 | 344 | 80 |
| ethoxylated bisphenol A diacrylate | 60 | 512 | 1080 |
| pentaerythritol tetraacrylate | 103 | 298 | 520 |
| ethoxylated trimethylolpropane triacrylate | 103 | 428 | 60 |
| polypropylene glycol mono-methacrylate | | 405 | 35 |
| propoxylated trimethylolpropane triacrylate | −15 | 470 | 90 |
| polybutadiene dimethacrylate 80%/HexaneDiol DiAcrylate ester 20% | −75 | | 890@60 C. |
| low viscosity polyester acrylate oligomer | 1 | | 630 |
| polyester acrylate oligomer | 21 | | 7700 |
| epoxy acrylate oligomer | 62 | | 250@60 C. |
| polyester acrylate oligomer | −19 | | 28 |
| polyester acrylate oligomer | 42 | | 65 |
| polyester acrylate oligomer | −45 | | 150 |
| polyester acrylate oligomer | −22 | | 180 |
| bisphenol A base epoxy acrylate | 60 | | 2150@65 C. |

| Monomer | TgC | Mw | viscosity cps 25 C. |
|---|---|---|---|
| epoxy acrylate blended with SR351 | | | 800 |
| aromatic urethane acrylate | 50 | | 700@60 C. |
| aliphatic urethane acrylate | 27 | | 660@60 C., 10080@25 C. |
| urethane acrylate | −47 | | 4155@60 |
| low viscosity diacrylate oilgomer | 26 | | 1000 |
| aliphatic polyester base urethane diacrylate | −38 | | 58250@60 C. |
| polybutadiene dimethacrylate | −39 | | 4125@60 C. |
| aliphatic urethane acrylate | 30 | | 60000@60 C. |
| methacrylated polybutadiene | | 6000 | 65000@45 C. |
| methacrylated polybutadiene, UV curable resin, soluble in water | | 3200 | 25000 |
| epoxidized soy bean oil acrylate | −22 | | 25100 |
| trifunctional urethane acrylate | 43 | | 156000, 2800@60 C. |
| aromatic urethane acrylate | 30 | | 15000@60 C. |
| aromatic polyester based urethane diacrylate | | | 8900 |
| polyester acrylate oligomer | −20 | | 52000 |
| polyester acrylate oligomer, water soluble for UV wood coating | | | 11000E@60 C. |
| polyester acrylate oligomer | 35 | | 85000 |
| aromatic urethane acrylate | 35 | | 58000 |
| aliphatic urethane acrylate | 22 | | 6190@60 C. |
| polybutadiene dimethacrylate 80%/HDODA 20% | −75 | | 890@60 C. |
| polyester acrylate oligomer | 21 | | 7700 |
| epoxy acrylate oligomer | 62 | | 250@60 C. |
| polyester acrylate oligomer | 42 | | 65 |
| aromatic urethane acrylate | 50 | | 700@60 C. |
| urethane acrylate | −47 | | 4155@60 |
| caprolactone modified neopentylglycol hydroxypivalate diacrylate | | 768 | 200-300 |
| urethane dimethacrylate | 25 | | 1740@60 C. |
| melamine acrylate | | | 1500 |
| bisphenol A base epoxy acrylate | 60 | | 2150@65 C. |
| urethane dimethacrylate | 25 | | 1740@60 C. |
| caprolactone modified neopentylglycol hydroxypivalate diacrylate | | 768 | 200-300 |
| polybutadiene dimethacrylate 80%/HexaneDiol DiAcrylate ester 20% | −75 | | 890@60 C. |
| polyester acrylate oligomer | 21 | | 7700 |
| epoxy acrylate oligomer | 62 | | 250@60 C. |
| polyester acrylate oligomer | 42 | | 65 |
| bisphenol A base epoxy acrylate | 60 | | 2150@65 C. |
| aromatic urethane acrylate | 50 | | 700@60 C. |
| urethane acrylate | −47 | | 4155@60 |

TABLE 2

Viscosity of the internal phase of the capsules is adjustable by blending monomers. In this table the internal phase contains: activator DPC 3% by weight in the monomers or initiator CHP 5% by weight in the monomers, M corresponds to THFA/HDDMA 50/50.

| Monomers in the internal phase | Viscosity (cps, 25° C.) Brookfield model LVF, spindle 2, 60 rpm |
|---|---|
| Melamine acrylate oligomer (Doresco UV75° C., 1500 cps)/M 50/50 | 15 |
| Bisphenol A base epoxy acrylate (CN120, 2150 cps @ 65° C.)/M 40/60 | 25 |
| Urethane dimethacrylate (CN1963, 1740 cps @ 65° C.)/M 50/50 | 53 |
| Polybutadiene (Ricon 130, 750 cps)/M 50/50 | 25 |

The viscosity of the internal phase is preferably lower than 100 cps. CN120 and CN1963 are products of Sartomer (Exton, Pa). Doresco™ is a trademark of Lubrizol, Wickliffe, Ohio. DPC is diphenyl carbazone. CHP is cumene hydroperoxide. M corresponds to tetrahydrofurural methacrylate (THFA) blended with hexane diol dimethacrylate (HDDMA) in a 50/50 percent ratio by weight.

TABLE 3

| Activator + diluent monofunctional + difunctional monomer | Resultant Viscosity | Resultant Tg |
|---|---|---|
| Hexanedioldimethacrylate + tetrahydrofurfural methacrylate and 3,5-1,2-dihydro-1-phenyl-2-pyropylpyridine | <500 Cp | <35° C. |

Table 3 is another example of blending of monomers to achieve a resultant viscosity of less than 500 Cp and resultant Tg of less than 35° C.

The monomer and initiator blend is a free flowing liquid which is encapsulated and comes into reactive contact with both parts of the two part curative when the capsules are fractured.

Reactive contact of the monomer and first-part curative with the second-part curative is effected by fracturing, shearing, crushing, or otherwise breaking the microcapsules so that the free flowing monomer and first-part curative comes into contact with the second-part curative. Mixing occurs through flow of the free flowing monomer and initiator from the capsule interior and flow of activator from the capsule interior upon application of pressure or relative movement of the substrates such as when an interference fit is affected. Common interference fit assemblies include threads on bolts, mortise and tenon, and various snap-fit assemblies or tongue and groove assemblies and couplers.

The monomers useful in the invention are difunctional acrylate esters, difunctional methacrylate esters and difunctional polyurethane acrylate esters and epoxy acrylates stable in the presence of initiator. Monomers shall be understood as including oligomers thereof. Optionally, an inhibitor such as hydroquinone can be added to the monomer and initiator blend in the capsules to prevent premature polymerization.

The initiator (first-part of the two-part curative) is blended with the monomer and preferably forms the internal or core contents of the first population of polymeric microcapsules. Optionally the initiator can be separately encapsulated though the preferred embodiment herein is a blending of the monomer and initiator and encapsulation of the blend.

Useful monomers in the invention are di- and poly-functional acrylate esters, difunctional (meth)acrylate esters, polyfunctional (meth)acrylate esters, difunctional urethane acrylate esters, polyfunctional urethane acrylate esters and polyfunctional and difunctional epoxy acrylate monomers and oligomers used alone or in combination as blends. In alternate embodiments, optionally, the di- and polyfunctional acrylates, methacrylates, urethane acrylates, and epoxy acrylates are further blended with monofunctional acrylates, methacrylates, urethane acrylates and epoxy acrylates.

In one form of the embodiments, the encapsulated curable adhesive composition is assembled as a two part system. The curative is of two parts. The first-part curative is a free radical initiator, preferably a peroxy initiator. The initiator is preferably encapsulated together with the monomer. Alternatively the initiator may be separately encapsulated.

A typical and preferred example of the initiator is cumene hydroperoxide. More particularly, the free radical initiator needs to be soluble or dispersible in the monomers and oligomers. The free radical initiator can be selected from the group of initiators comprising an azo initiator, peroxide, dialkyl peroxide, alkyl peroxide, peroxyester, peroxycarbonate, peroxyketone and peroxydicarbonate. The free radical initiator can be selected from 2,2'-azobis (isobutylnitrile), 2,2'-azobis(2,4-dimethylpentanenitrile), 2,2'-azobis (2,4-dimethylvaleronitrile), 2,2'-azobis(2-methylpropanenitrile), 2,2'-azobis (methylbutyronitrile), 1,1'-azobis (cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl) peroxydicarbonate, di(2-ethylhexyl) peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy) hexane, t-amyl peroxy-2-ethyl-hexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexane-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate and ethyl 3,3-di-(t-amylperoxy)-butyrate.

The initiator is employed at an amount of 10 percent or less by weight in the core of the capsules and more preferably from about 3 to 5 percent by weight, and most preferably 0.1 to 5 percent by weight (based on weight of the internal phase or core of the capsules).

The monomers desirably crosslink in contact with both parts of the two part adhesive. Preferably, the first-part curative is blended with the monomer and encapsulated together with the monomer forming a first population of microcapsules. In one embodiment the second-part curative is positioned external to the microcapsules, for example, on the outside of the capsule wall, on a substrate to be joined, in a carrier, or a binder, with all such placements of the second curative being deemed external to the first population polymeric capsules. The second curative could also be separately encapsulated forming a second population of microcapsules.

The monomers for example can be selected from the group of monomers and oligomers consisting of alkene glycol dimethacrylate, alkyl dimethacrylate, alkyldiol dimethacrylate, alkoxy alkanol diacrylate, trialkanol triacrylate, alkoxy (alkoxy)$_n$ alkyl triacrylate, alkoxy (alkoxy)$_n$ alkyl dimethacrylate, aralkyl dimethacrylate, cycloalkyl dimethacrylate, alkoxy dimethacrylate, bicycloalkyl dimethacrylate, cycloalkoxy dimethacrylate, alkene glycol diacrylate, alkyl diacrylate, alkyldiol diacrylate, alkoxy alkanol dimethacrylate, trialkanol trimethacrylate, alkoxy (alkoxy)$_n$ alkyl trimethacrylate, alkoxy (alkoxy)$_n$ alkyl diacrylate, aralkyl diacrylate, cycloalkyl diacrylate, alkoxy diacrylate, bicycloalkyl diacrylate, cycloalkoxy diacrylate, wherein the alkyl and alkene moieties are of 1 to 16 carbons, the cycloalkyl moieties are of 4 to 8 carbons, n is an integer from 1 to 6. Aromatic polyether urethane (meth)acrylates, aliphatic polyester, aliphatic urethane acrylate including alkyl, alkenyl or aryl substituted or unsubstituted urethane acrylates and epoxy acrylates can also be advantageously employed More specifically, by way of illustration and not limitation, the monomers can be selected from any of hexyl dimethacrylate; triethylene glycol dimethacrylate; ethylene glycol dimethacrylate; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; diethylene glycol dimethacrylate; 1,6 hexanediol diacrylate; 1,6 hexanediol dimethacrylate; neopentyl glycol diacrylate; neopentyl glycol dimethacrylate, polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethyacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate, and the like, and mixtures thereof.

Monofunctional acrylates, methacrylates and urethane acrylates, urethane methacrylates for blending with the monomer include, by way of illustration and not limitation, monomers and oligomers of alkyl acrylate, aralkyl acrylate, cycloalkyl acrylate, alkoxy acrylate, cycloalkoxy acrylate, bicycloalkyl acrylate, alkoxy (alkoxy)$_n$ acrylate, alkyl methacrylate, polyalkene(meth)acrylate, aralkyl methacrylate, cycloalkyl methacrylate, alkoxy methacrylate, bicycloalkyl methacrylate, cycloalkoxy methacrylate, and alkoxy (alkoxy)$_n$ methacrylate. The alkyl moieties should be selected preferably of 1 to 16 carbons, the cycloalkyl moieties from 4 to 8 carbons, and n is an integer from 1 to 6.

More particularly the monofunctional acrylates, methacrylate or urethane acrylates or methacrylates can be selected from n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, 2-ethylhexyl methacrylate, n-octyl methacrylate, iso-octyl acrylate, iso-octyl methacrylate, isononyl acrylate, isodecyl acrylate, 2-ethoxyethyl methacrylate; butyl diglycol methacrylate; tetrahydrofurfuryl acrylate; tetrahydrofurfurylmethacrylate; furfuryl methacrylate 2-phenoxyethyl acrylate, isohexyl acrylate; tridecyl acrylate; tridecyl methacrylate; ethoxylated nonyl phenol acrylate and the like and mixtures thereof.

The catalyst is an organic acid or a salt of a transition metal or a metal ion. The catalyst optionally can be separately encapsulated. Preferred are copper salts such as copper chloride. Organo copper salts can also be advantageously employed such as copper acetyl acetonate and copper ethyl hexanoate. Optionally the catalyst such as copper salts can be encapsulated with the activator, or optionally even separately encapsulated.

The catalyst is used at about less than 2 percent and more preferably 0.2 to 1 wt. percent (based on weight of the reactive constituents making up the adhesive).

An activator, preferably separately encapsulated is included. Useful activators to be used in combination with the catalyst and first population of microcapsules include ferrocene, butyl ferrocene, diethylferrocene, amino rhodanine, diphenyl carbazone, diphenyl carbazide, dithizone, guaiazulene.

More particularly, the activator is an organonitrogen compound such as tertiary amine, amide and imide compounds, aliphatic amines, aldehyde amines, aromatic amines. Specific examples include, without limitation, acetylphenyl hydrazine, diphenyl carbazide, diphenyl carbazone dithizone, propyl dihydropyrridine, acetaldehyde-benzylamine, butyraldehyde aniline, benzylamine, various dialkyl amines such as dialkylamine, aniline, toluidine, hexamethylene tetramine, polyethyleneimine, aminorhodanine, tetramethylthiourea, mercaptobenzothiazole, and the like.

The activators are used at preferably less than 10 percent by weight, and more preferably from 1 to 5 percent by weight of the reactive adhesive composition (excluding weight of binder and wall material).

Microcapsules are obtained by providing an aqueous mixture containing a colloidal dispersion of hydrophilic wall-forming material and monomers with initiator.

High shear agitation is applied to the aqueous mixture to achieve a particle size of the core material of about 0.1 to 250μ (250 microns), preferably 0.1 to 100 microns and more preferably 0.1 to 50 microns. Smaller capsules of 10μ or less can be produced for specialized applications.

Common microencapsulation processes can be viewed as a series of steps. First, the core material which is to be encapsulated is emulsified or dispersed in a suitable dispersion medium. This medium is preferably aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. This process is commonly known as coacervation.

Gelatin or gelatin-containing microcapsule wall material is well known. The teachings of the phase separation processes, or coacervation processes which are described in U.S. Pat. Nos. 2,800,457 and 2,800,458 are incorporated herein by reference. Uses of such capsules are described in U.S. Pat. No. 2,730,456.

In-situ polymerization, microcapsule walls are formed from materials present in a discontinuous phase. Thus, the wall forming materials dispersed into the discontinuous phase polymerize and migrate outward to the interface between the discontinuous and continuous phases, resulting in the formation of microcapsule wall. Known techniques of in-situ polymerization include free radical polymerization and the incorporation of reactive polyisocyanates and polyol compounds within the discontinuous phase.

More recent processes of microencapsulation involve, and preferred herein, are the polymerization of urea and formaldehyde, monomeric or low molecular weight polymers of dimethylol urea or methylated dimethylol urea, melamine and formaldehyde, monomeric or low molecular weight polymers of methylol melamine or methylated methylol melamine, as taught in U.S. Pat. No. 4,552,811 incorporated herein by reference. These materials are dispersed in an aqueous vehicle and the reaction is conducted in the presence of acrylic acid-alkyl acrylate copolymers.

The microcapsule can be formed from materials comprising gellable colloids, carboxymethyl cellulose, gelatin, gelatin-gum arabic, methylated methylol melamine resin, melamine formaldehyde, dimethylol urea, urea formaldehyde, methylol melamine, methylated dimethyl urea, a gelatin anionic polymer, alkyl acrylate-acrylic acid copolymer or other commonly-used polymeric materials used in coacervation.

The invention is not limited to one manner of microencapsulation. Processes of microencapsulation are now well known in the art. U.S. Pat. Nos. 2,730,456, 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; British Pat. No. 2,062,570 describing a process for producing microcapsules having walls produced by polymerization of melamine and formaldehyde in the presence of a styrene-sulfonic acid. Microcapsules are also taught in U.S. Pat. Nos. 2,730,457 and 4,197,346. The more preferred process for forming microcapsules are from urea-formaldehyde resin and/or melamine formaldehyde resin as disclosed in U.S. Pat. Nos. 4,001,140; 4,081,376, 4,089,802; 4,100,103; 4,105,823; 4,444,699 or most preferably alkyl acrylate-acrylic acid copolymer capsules as taught in U.S. Pat. No. 4,552,811. Each patent described is incorporated herein by reference to the extent each provides guidance regarding microencapsulation processes and materials.

Preferably the capsules employed are from 0.1 to 100 microns, preferably 1 to 50 microns, more preferably less than 40, and most preferably less than 30 microns. Other sizes are possible for specific applications.

The first step in the encapsulation process is the preparation of the discrete droplets or domains of the monomer in the dispersion medium. Preferably the initiator is blended first with the monomer. Where such materials are in solution or liquid form and the encapsulation is to be by way of, e.g., coacervation, interfacial polymerization, etc., the dispersion medium solution or liquid containing the monomer and initiator is subjected to high shear mixing or agitation to create a suspension, emulsion or colloidal system of discrete domains of the monomers and initiator blend of the requisite size. The catalyst of the second-part curative can be incorporated into a solid binder or substantially solid carrier, and the carrier or binder may be ground and sorted to a desired particle size. A film forming binder or carrier is preferred through solvent solubilized solids can also be employed. The activator of the second-part curative is preferably in separate microcapsules.

A useful microencapsulation technique is coacervation wherein the material to be encapsulated (monomer and first-part curative) is dispersed or emulsified in a liquid solution of the material to be used as the wall material. The solution is perturbed to cause a phase separation of the wall material, or at least a portion thereof, from the solvent with all or some of the wall material coating the dispersed material to be encapsulated. In this process, the wall forming material may directly separate out onto the emulsified or dispersed core material or it may form its own emulsion with the droplets of the wall material subsequently depositing on the droplets of the core material. In either case, the liquid wall material deposits itself as a continuous coating about the dispersed droplets of the internal phase or capsule core material of monomers and initiator and the wall material is then solidified. Solution perturbation can be any that affects the solubility of the wall material including changes in temperature and addition of another solvent, including, for example, the addition of a non-solvent for the wall material. It should be readily understood by those skilled in the art that the foregoing may be accompanied by a pH shift with wall materials such as gelatin to promote the phase separation in the wall formation step, as taught in Green (U.S. Pat. Nos. 2,800,457 and 2,800,458, incorporated herein by reference).

In coacervation encapsulation, the material to be coated is typically a liquid and is emulsified in the solvent to form droplets which are then coated with the wall material. Oftentimes it is advantageous to also employ an emulsification agent to assist with the emulsification of the carrier materials or precursors thereof. Preferred emulsification agents that can be used are amphiphilic, that is, they contain both hydrophilic and hydrophobic groups in the same molecule. Exemplary emulsification agents include, but are not limited to, partially hydrolyzed polyvinyl alcohol, starch derivatives, cellulose derivatives, polyacrylamide, and the like. A preferred emulsification agent for use in the invention is partially hydrolyzed polyvinyl alcohol or polyacrylic acid. Polyacrylic acid used as a stabilizer with polyamide wall material was particularly preferable. In a preferred method, high shear agitation is provided to the aqueous mixture to achieve a droplet size of less than about 250 microns, preferably less than 100 microns.

The conditions for encapsulation will vary based upon the choice of the material used for the capsule wall. Suitable materials for the capsule walls include natural materials such as gelatin, gum arabic, starches, shellac, and rosin, polymers such as polyvinyl alcohol, polyethylene, polypropylene, polystyrene, polyacrylamides, polyethers, polyesters, polyamides, polybutadiene, polyisoprene, silicones, epoxies, polyurethanes, formaldehyde resins such as reaction products of formaldehyde with phenols, urea, and melamine, and copolymers such as polyurethane copolyethers. Alkylacrylate-acrylic acid copolymer is a preferred wall material.

Dyes, pigments, fillers, plasticizers, binding agents, and other additives can be incorporated in the microcapsule wall or applied to the microcapsule wall surface. One important parameter to keep in mind when formulating wall materials is permeability. Generally, the wall material should have low permeability, at least with respect to the material to be encapsulated. No or low permeability of the capsule wall is particularly important with respect to the second-part curative in the binder or external to the capsules so as to prevent loss of the curative and premature polymerization of the curable composition. Likewise, it may be important for the microcapsule wall to be impermeable or of low permeability to the curable component of the curable composition so as to prevent any ingress of the same of external materials. Dependent upon the encapsulated material, it may also be desirable to formulate the wall material to have low permeability to certain gases such as oxygen or low permeability to liquids such as water or solvents such as toluene or tetrahydrofuran. The requisite permeation rates will vary for each system, but can be met by judicious choice of the wall material and by degree of crosslinking of the wall material. Generally, as crosslinking increases, the permeation rate decreases.

The microcapsule walls can comprise less than 15 percent and preferably from 5 to 10 percent by weight of the encapsulated components.

Optionally the microcapsules with monomer and first-part curative, and the second-part curative metal catalyst are dispersed in a binder or adhered to a surface by the binder. The second-part curative activator is separately microencapsulated and also dispersed in the binder or adhered to a surface by the binder. It is to be understood in this context that there are two populations of microcapsules. The first population of microcapsule includes the first-part curative (initiator) with monomer as the capsule core contents. The second-part curative comprises catalyst external to the microcapsules and a second population of microcapsules with activator, preferably a hydrophobic activator. The binder could constitute a carrier material for the capsules. Preferably the binder is a polymeric material or selected from almost any adherent material and preferably selected from binder materials such as polyvinylalcohol, starches, modified starches, gelatin, hydroxyl ethylcellulose, methyl cellulose, methyl-hydroxypropyl cellulose, or selected from many film forming materials such as carboxylated polyvinyl alcohols, polyacrylates, urethanes, polyvinylacetates, vinyl acetate ethylene copolymers, carboxylated vinyl acetate, polystyrene, or various film forming latexes. The binder is preferably used in an amount sufficient to hold the adhesive constituents or capsules onto the substrate but less than an amount that would interfere with adhesion of the formed adhesive when the capsules are ruptured and the contents come into reactive contact.

Various additives such as rheology modifiers, rheology aids, tackifiers, plasticizers, rubberized particles, styrene-butadiene rubber lattices, lubricants, toners, coloring agents, can be optionally employed.

Optionally, as an alternative embodiment the binder material can be selected to be UV curable binders include materials such as those curable using electron beam, UV radiation or visible light, such as acrylated monomers or oligomers of acrylated epoxy resins, acrylated urethanes and polyester acrylates and acrylated monomers including monoacrylated, multiacrylated monomers, and thermally curable resins such as phenolic resins, urea/formaldehyde resins and epoxy resins, as well as mixtures of such resins. The curing mechanism through UV light can be employed with or without the assistance of an additional thermal cure mechanism. In the context of this application it is understood that the term "radiation curable" embraces the use of visible light, or ultraviolet (UV) light, and electron functions and radiation cure functions can be provided by different functionalities in the same molecule.

If UV cure of the binder is desired, generally any UV-curable binder may be chosen. Examples of suitable binders also include unsaturated polyester resin and alkyl resins, unsaturated melamine formaldehyde resins, polybutadiene resins, and unsaturated compounds such as (meth)acrylates and allyl compounds.

Examples of UV-curable polyesters include polycondensation products from unsaturated di- or polycarboxylic acids or derivatives thereof, for instance: maleic acid, maleic anhydride and/or fumaric acid, and polyols such as ethylene glycol, 1,2-propane diol, diethylene glycol, hexane diol, glycerol, trimethylol propane or pentaerythritol. These polyesters can be blended with ethylenically unsaturated monomeric compounds, such as methacrylic compounds and vinyl compounds, including acrylate compounds and allyl compounds.

Illustrative UV curable (meth)acrylates and allyl compounds include methyl acrylate, methyl methacrylate, ethyl acrylate, ethyl methacrylate, butyl acrylate; (meth)acrylic esters of aliphatic diols and/or polyols, for instance: ethylene diacrylate, trimethylol propane triacrylate and pentaerythritol tetraacrylate; hydroxyl(meth)acrylates such as hydroxyethyl acrylate, 2-hydroxypropyl acrylate, 3-hydroxypropyl methacrylate, 4-hydroxybutyl acrylate and pentaerythritol triacrylate and allyl compounds such as diallyl phthalate, diallyl maleate, triallyl isocyanurate and ethylene glycol diallyl ether.

A desirable UV binder is urethane acrylate resin, more particularly at least one isocyanate group-containing adduct of (a) an acrylic or methacrylic hydroxyl ester having 5 to 20 carbons atoms and (b) a polyisocyanate having 4 to 44 carbon atoms and 2 to 4 isocyanate groups. As examples of suitable isocyanate compounds may be mentioned hexamethylene diisocyanate, 2,2,4-trimethylhexane-1,6-diisocyanate, 2,4,4-trimethylhexane-1,6-diisocyanate, and cyclohexyl-1,4-diisocyanate, or the adduct of hexamethylene diisocyanate.

Suitable photoinitiators include for example: aromatic carbonyl compounds such as benzyl, benzyl dimethyl ketal, acetophenone, substituted acetophenones, thioxanthone chlorothioxanthone and preferably benzophenone. Optionally, use may be made of compounds such as aromatic azo compounds and compounds such as benzoin and ethers thereof, such as the methyl ether, the ethyl ether, the propyl ether and the t-butyl ether. Mixtures of photoinitiators may also be used.

The photoinitiator is usually present in an amount of 0.05 to 10% by weight, based on the UV-curable binder. Some free radical polymerizations are inhibited by oxygen and may require provision of an inert atmosphere. Microencapsulation of components can help to restrict oxygen contact.

Preferably the binder in a UV reactive system is a reactive oligomer or prepolymer which polymerizes when subjected to UV radiation in the presence of a suitable initiator. An optional component of the binder can be commonly employed diluents which modify the cure rate and, for example, the viscosity of the uncured composition. The binder must be capable of adhering to the substrate on curing, but it should of course also wet or adhere to the substrate before curing.

The following is an illustrative example of a UV curable binder. CN monomers are products of Sartomer (Exton, Pa.): CN550 (amine modified polyether acrylate oligomer) 53.2% by weight; CN501 (amine modified polyether acrylate oligomer) 22.8%; CN976 (aromatic urethane diacrylate) 20%; CN385 (benzophenone) 2%; and Irgacure 184 (photoinitiator) 2% (Ciba Specialty Chemicals). Viscosity at 25° C. is about 2000 mPa·s.

The components of the second-part curative preferably are water soluble or water dispersible and are preferably external to the capsules. The components that are hydrophobic or oil soluble are preferably internal to the capsules. Most preferably the activator is selected to be hydrophobic and is separately encapsulated in a second population of microcapsules, separate and distinct from the first population of microcapsules encapsulating the monomer and first curative comprising initiator.

The second-part curative comprises a catalyst and activator. The second-part curative is external to the first population of polymeric microcapsules, on the outside capsule wall, or in the binder. In one embodiment, the monomer is a difunctional methacrylate, and the monomer can include in addition a monofunctional methacrylate, such as furfuryl methacrylate. The difunctional methacrylate is preferably butylene glycol dimethacrylate, or hexane diol dimethacrylate.

Looking now at the drawings, FIG. 1 depicts an embodiment according to the invention. Monomer, and initiator which is the first-part curative, form the core of microcapsules 1, referred to herein as the first population of microcapsules. Catalyst 2A, a metallic salt or organic acid or metal ion, is shown outside of microcapsules 1. Sizes are exaggerated.

Activator 2B such as a tertiary amine, imide or amide can be separately encapsulated to form a second population of microcapsules. The microcapsule 5 for activator 2B in FIG. 1 is depicted using dotted lines since the encapsulation is optional. Other optional configurations for activator 2B include the arrangement of FIG. 4 wherein activator 2B is shown dispersed in a binder material 4' or carrier. The binder materials 4, 4', and 4" can be the same or different binders. The binder can constitute a matrix material or foam that temporarily isolates activator 2B from catalyst 2A.

Figure 5:
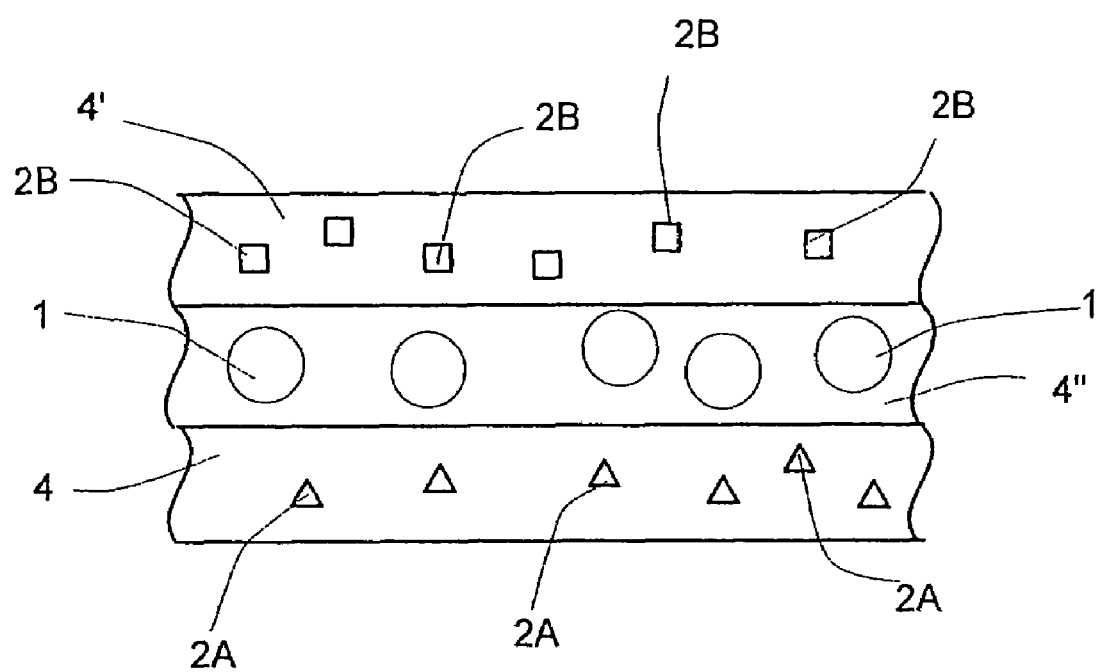
FIG. 5 is an embodiment depicting the second-part curative disposed on opposite sides of the layer with the microcapsules containing monomer and the first-part curative.

An alternative arrangement with larger partial separation of catalyst 2A from activator 2B is depicted in FIG. 5. The binder materials 4, 4' and 4" can each be the same or different binders.

Figure 2:
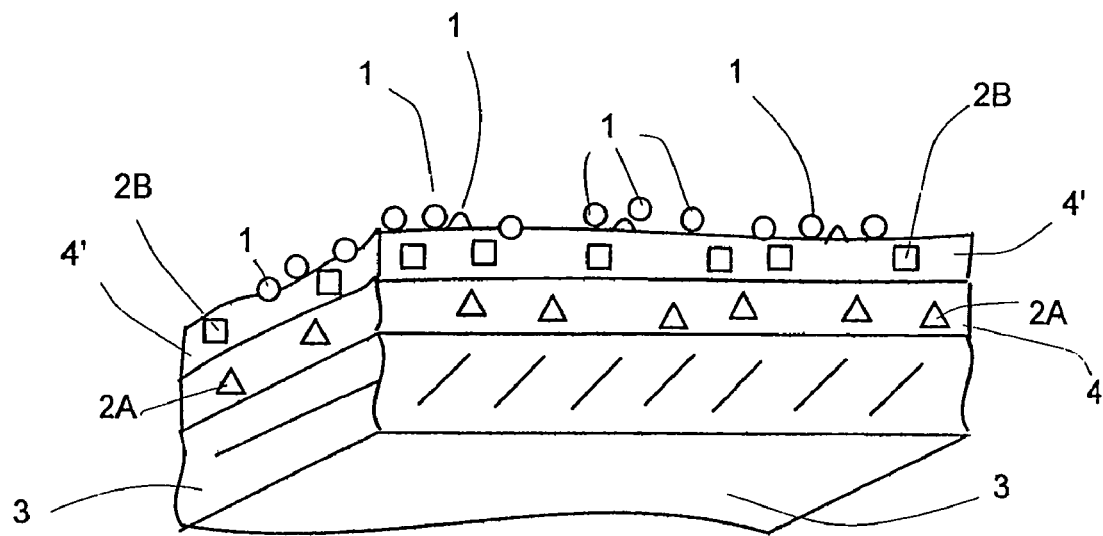
FIG. 2 is a cutaway perspective view of a substrate having coatings applied according to an embodiment of the invention.

FIG. 2 illustrates the curable composition of the invention as a coating onto substrate 3 which can be any relatively rigid material such as hardwood, fiberboard, fiberglass, polymeric, natural or synthetic, composites such as fibers dispersed in various matrices such as resins, metals, or ceramics. The substrate should be selected to be receptive to the adhesive composition and should be tested for forming strong bonding with the adhesive composition.

In FIG. 2 catalyst 2A and activator 2B are shown dispersed in binder materials 4 and 4' respectively. Microcapsules 1 with monomer and initiator core are shown adhered to binder material 4'.

Dimensions are exaggerated in the drawings. The quantity of the binder is exaggerated and can be optionally limited to that quantity necessary to adhere the components of the adhesive system. It is therefore not always necessary to envelope the catalyst or activator, especially if these constituents are separately encapsulated.

Figure 3:
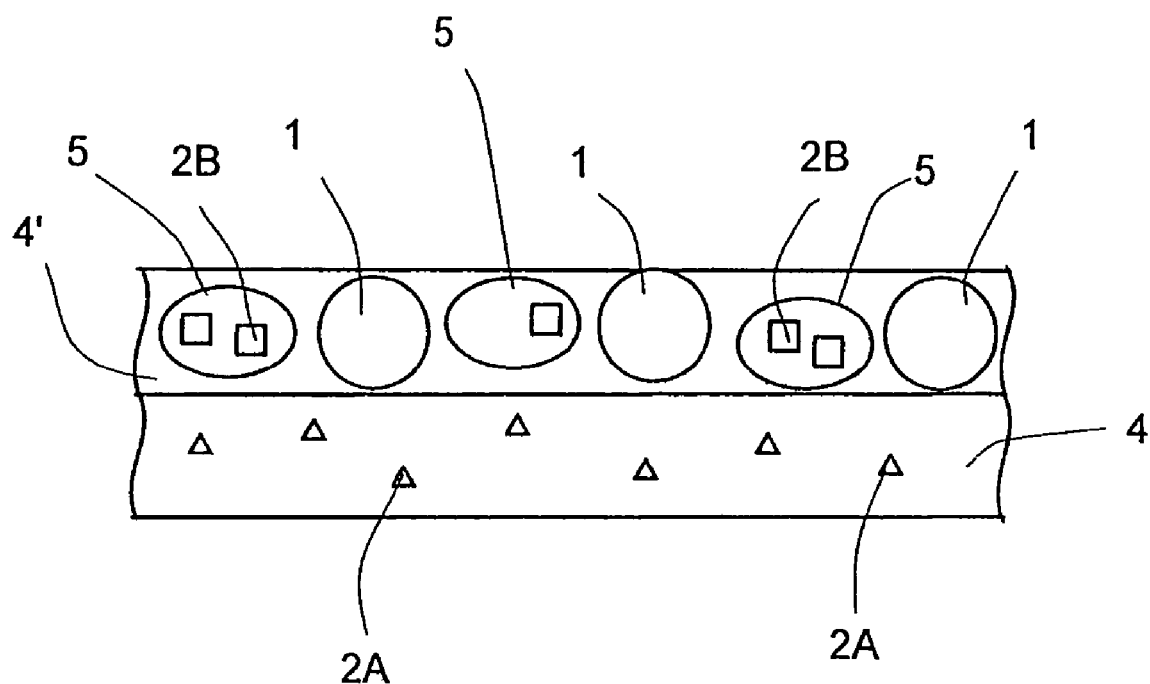
FIG. 3 is a side view of an alternative embodiment depicting encapsulated activator showing the second-part curative where catalyst is applied as a lower layer, and where activator is separately microencapsulated.

FIG. 3 is an alternative embodiment wherein microcapsules 1 containing monomer and the first-part curative are dispersed in binder material 4' overcoated over lower binder material layer 4. The binder materials can be the same or different. Microcapsules 1 containing monomer and the first-part curative form a first population of microcapsules. A second population of microcapsule 5 is (shown smaller in size and ellipsoid in shape for purposes of illustration. Size selection is optional and can be selected to be larger than the first population of microcapsules). The second population of microcapsules contain activator 2B within the core.

In FIG. 3, as a further alternative, the capsules 1, activator 2B, catalysts 2A can optionally be uniformly or chaotically dispersed in a single binder material 4 forming a single layer adhesive coating. The single layer adhesive coating is often preferable and most economic.

Figure 4:
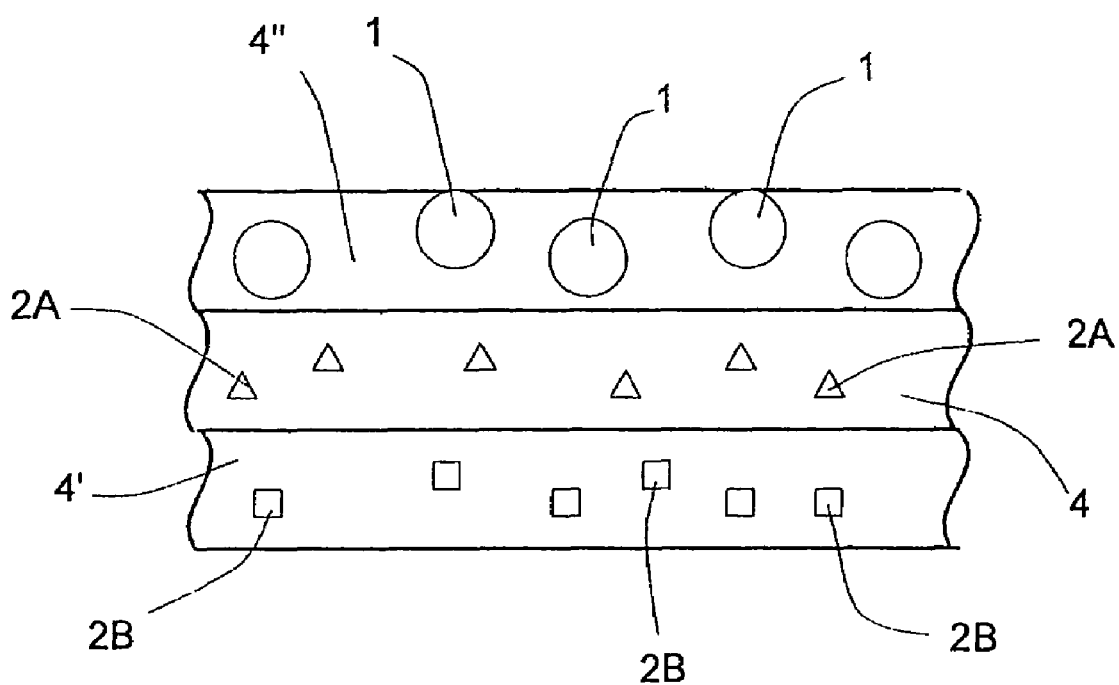
FIG. 4 is an alternative embodiment depicting the second-part curative where activator is a lower layer and catalyst is the middle layer or is in a middle layer.

In FIG. 4 microcapsules 1 contain monomer and the first-part curative. The second-part curative of catalyst 2A and activator 2B is illustrated as dispersed in separate layers of binder material 4 and 4'. Binder materials 4, 4' and 4" can be the same or different in each layer. Microcapsules 1 are shown in the top binder layer 4". Alternatively, microcapsules 1 can be dispersed throughout any of the binder material layers.

In FIG. 4 activator 2B is a lower layer and catalyst 2A forms a middle layer or is dispersed in a binder 4.

In FIG. 5 the second-part curative is disposed on opposite sides of the binder layer with microcapsules containing monomer and the first-part curative. Catalyst 2A is depicted below capsules 1, and activator 2B is illustrated applied as an overcoat on the opposite side of capsules 1 in binder 4". Optionally binder 4" can be omitted if adherence via binders 4' and 4 is sufficient to hold capsules 1, activator 2B and catalyst 2A in place.

Figure 6:
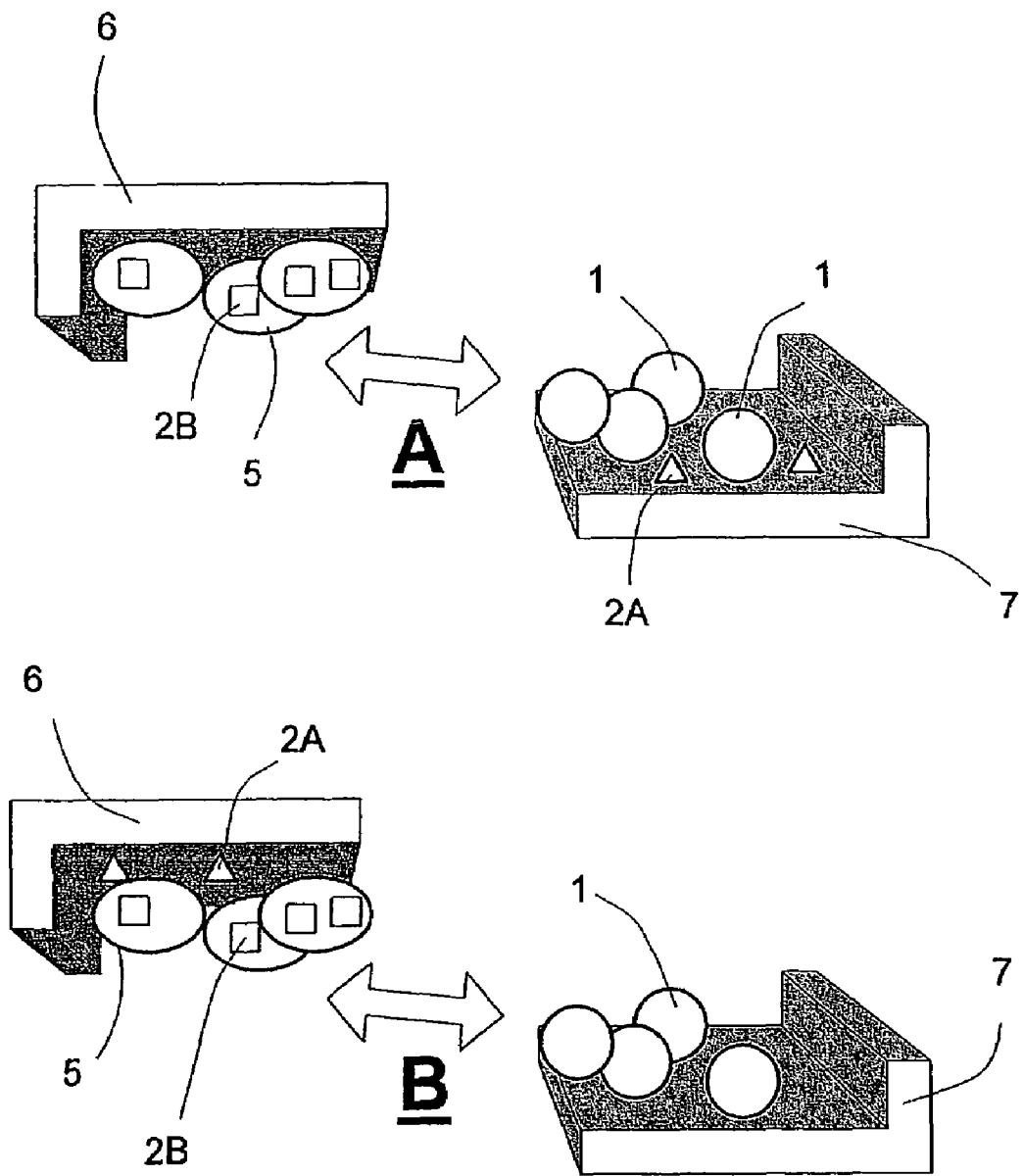
FIG. 6 illustrates alternate embodiments where the components of the system are coated onto separate surfaces. In version A the capsules with first-part curative are applied to the same surface with catalyst. In version B the catalyst is applied to the surface coated with a second population of capsules encapsulating activator.

FIG. 6 illustrates alternative embodiments A and B where the components of the adhesive system are coated onto separate surfaces 6 and 7. Surfaces 6 and 7 can take the form of a variety of mating or interlocking configurations such as the thread surfaces of a bolt and nut, mortise and tenon, dovetail, interlocking tongue and groove, snap-lock parts, male and female couplers, and various other configurations bringing at least two surfaces into proximate contact. Surfaces 6 and 7 can include a tab and corresponding recess, detent, friction fit or other mechanical interlock to facilitate holding the surfaces in place until the adhesive cures or sets. The adhesive system of the invention provides a dry-to-the-touch adhesive that can facilitate more permanent joining and assembly.

In FIG. 6 version A capsules 1 with first-part curative are shown applied to at least one face of surface 7. Catalyst 2A is also shown applied along with the first population of capsules 1.

A second population of capsules 5 encapsulating activator 2B are applied to at least one face of surface 6.

In FIG. 6, an alternative embodiment is also illustrated as version B wherein the catalyst 2A is applied to a face of surface 6 with the second population of capsules 5 which encapsulate activator 2B. Sufficient binder (not shown) should be utilized to adhere capsules 1 and 5 and catalyst 2A to hold them in position until the capsules are ruptured. This allows the free flowing liquid contents of the capsules to come into reactive contact such that the first-part curative and second-part curative can react with the monomer forming the structural adhesive.

As a yet further alternative embodiment, capsules 1 and 5 can be applied with binder to one or the same surface, and a catalyst 2A can be applied to a mating surface. In a yet further embodiment, all components such as capsules 1 and 5, catalyst 2A, activator 2B can be applied to the same surface. In such instance it may be desirable to pre-apply the catalyst or activator first as a first layer on the surface. All such variations are within the scope of the invention.

The examples herein are considered to illustrate the invention and should not be considered as limiting. In the examples all parts or proportions are by weight and all measurements are in the metric system, unless otherwise indicated.

EXAMPLE 1

Preparation of Microcapsules Containing 5% Initiator in Internal Phase

The composition of the capsules is as follows:

| Internal Phase (IP) | Hexanedioldimethacrylate, | 156.9 g |
|---|---|---|
| | Tetrahydrofurfuryl methacrylate, | 17.4 g |
| | Cumene hydroperoxide (CHP) | 9.2 g |
| 1$^{st}$ Water Phase: | Deionized water, | 112 g |
| | Acrylic acid butyl acrylate copolymer, | 17.5 g |
| | 5% NaOH aqueous solution | 14.1 g |
| | methoxymethyl methylol melamine | 2.9 g |
| 2$^{nd}$ Water Phase | Deionized water | 33.0 g |
| | Polyacrylic acid | 6.1 g |
| | Methoxymethyl methylol melamine | 17.4 g |

A procedure for preparing microcapsules is as follows. The 1$^{st}$ Water Phase was prepared according to the composition as listed above, and pH of the aqueous solution was adjusted to 5.82 with 5% sodium hydroxide solution, and maintaining the temperature of the solution at 65° C. Then the premixed internal phase was pre-heated to 65° C. was pre-emulsified into the 1$^{st}$ Water Phase by high shear agitation at 800 rpm to form an emulsion and then milled at 1700 rpm with a high shear milling blade until an emulsion droplet size of 14 μm was obtained as analyzed by a Model 780 Accusizer. Thereafter, the 2$^{nd}$ Water Phase was added to the emulsion along with 2.2 grams of sodium sulfate. The emulsion was mixed and maintained at 65° C. for 8 hrs. An average capsule size of 14.8 μm was obtained.

EXAMPLE 2

Preparation of Microcapsules Containing 2.5% Initiator in Internal Phase

The composition of and the procedures for preparing the microcapsules are the same as in Example 1 except for the following:

| Internal Phase (IP) | Hexanedioldimethacrylate, | 161.0 g |
|---|---|---|
| | Tetrahydrofurfuryl methacrylate, | 17.9 g |
| | Cumene hydroperoxide (CHP) | 4.58 g |

EXAMPLE 3

Preparation of Microcapsules Containing 1.5% Initiator in Internal Phase

The composition of and the procedures for preparing the microcapsules are the same as in Example 1 except for the following:

| Internal Phase (IP) | Hexanedioldimethacrylate, | 162.6 g |
|---|---|---|
| | Tetrahydrofurfuryl methacrylate, | 18.1 g |
| | Cumene hydroperoxide (CHP) | 2.75 g |

EXAMPLE 4

Preparation of Microcapsules Containing 5% Initiator in Internal Phase

The composition of and the procedures for preparing the microcapsules are the same as in Example 1 except for the following:

| 1st Water Phase: | Deionized water, | 112 g |
|---|---|---|
| | Acrylic acid butyl acrylate copolymer, | 9.1 g |
| | 5% NaOH aqueous solution | 14.1 g |
| | methoxymethyl methylol melamine | 2.9 g |
| 2nd Water Phase | Deionized water | 33.0 g |
| | Polyacrylic acid | 6.1 g |
| | Methoxymethyl methylol melamine | 8.8 g |

EXAMPLE 5

Preparation of Microcapsules Containing 5% Initiator in Internal Phase

The composition of and the procedures for preparing the microcapsules are the same as in Example 1 except for the following:

| Internal Phase (IP) | Hexanedioldimethacrylate, | 139.5 g |
|---|---|---|
| | Tetrahydrofurfuryl methacrylate, | 34.8 g |
| | Cumene hydroperoxide (CHP) | 9.2 g |

EXAMPLE 6

Preparation of Microcapsules Containing 1% Activator in Internal Phase

The composition of the capsules is as follows:

| Internal Phase (IP) | Hexanedioldimethacrylate, | 163.5 g |
|---|---|---|
| | Tetrahydrofurfuryl methacrylate, | 18.2 g |
| | 3,5-diethyl-1,2-dihydro-1-phenyl-2-pyropyl pyridine, | 1.83 g (1%) |
| 1st Water Phase: | Deionized water, | 112 g |
| | Acrylic acid butyl acrylate copolymer, | 17.8 g |
| | 5% NaOH aqueous solution | 13.6 g |
| | methoxymethyl methylol melamine | 2.9 g |
| 2nd Water Phase | Deionized water | 32.0 g |
| | Polyacrylic acid | 6.1 g |
| | Methoxymethyl methylol melamine | 17.2 g |

A procedure for preparing microcapsules is as follows. The 1st Water Phase was prepared according to the composition as listed above, and pH of the aqueous solution was adjusted to 5.82 with 5% sodium hydroxide solution, and temperature of the solution was maintained at 65° C. Then the premixed internal phase pre-heated to 65° C. was emulsified into the 1st Water Phase by mixing at 700 rpm to form an emulsion, and then milled at 1700 rpm with a high shear milling blade. After milling for 15 min, the 2nd Water Phase was added to the emulsion along with 2.2 grams of sodium sulfate. The emulsion was mixed and maintained at 65° C. for 8 hrs. An average capsule size of 15.4 μm was obtained as analyzed by a Model 780 Accusizer.

EXAMPLE 7

Preparation of Microcapsules Containing 5% Activator in Internal Phase

The composition of the capsules is as follows:

| Internal Phase (IP) | Hexanedioldimethacrylate, | 108 g |
|---|---|---|
| | Tetrahydrofurfuryl methacrylate, | 12 g |
| | 3,5-diethyl-1,2-dihydro-1-phenyl-2-pyropyl pyridine, | 6 g (5%) |
| 1st Water Phase: | Deionized water, | 104 g |
| | Acrylic acid butyl acrylate copolymer, | 18 g |
| | 5% NaOH aqueous solution | 14 g |
| | methoxymethyl methylol melamine | 3.0 g |
| 2nd Water Phase | Deionized water | 32.0 g |
| | Polyacrylic acid | 6.0 g |
| | Methoxymethyl methylol melamine | 17.7 g |

A procedure for preparing microcapsules is as follows. The 1st Water Phase was prepared according to the composition as listed above, and pH of the aqueous solution was adjusted to 5.82 with 5% sodium hydroxide solution, and temperature of the solution was maintained at 65° C. Then the premixed internal phase pre-heated to 65° C. was emulsified into the 1st Water Phase by a mixer at 700 rpm to form an emulsion, and then milled at 1500 rpm with a high shear milling blade until an emulsion droplet size of 14 μm was obtained as analyzed by a Model 780 Accusizer. Thereafter, the 2nd Water Phase was added to the emulsion along with 2.3 grams of sodium sulfate. The emulsion was mixed and maintained at 65° C. for 8 hrs. An average capsule size of 15.4 μm was obtained.

EXAMPLE 8

Preparation of Microcapsules Containing Only Activator in Internal Phase

The composition of the capsules is as follows:

| Internal Phase (IP) | 3,5-diethyl-1,2-dihydro-1-phenyl-2-pyropyl pyridine, | 183 g |
|---|---|---|
| 1st Water Phase: | Deionized water, | 112 g |
| | Acrylic acid butyl acrylate copolymer, | 17.8 g |
| | 5% NaOH aqueous solution | 13.6 g |
| | methoxymethyl methylol melamine | 2.9 g |
| 2nd Water Phase | Deionized water | 32.0 g |
| | Polyacrylic acid | 6.1 g |
| | Methoxymethyl methylol melamine | 17.2 g |

A procedure for preparing microcapsules is as follows. The 1st Water Phase was prepared according to the composition as listed above, and pH of the aqueous solution was adjusted to 5.82 with 5% sodium hydroxide solution, and temperature of the solution was maintained at 65° C. Then the premixed internal phase pre-heated to 65° C. was emulsified into the 1st Water Phase by a mixer at 700 rpm to form an emulsion, and then milled at 1500 rpm with a high shear milling blade. After milling for 15 mins, the 2nd Water Phase was added to the emulsion along with 2.2 grams of sodium sulfate. The emulsion was mixed and maintained at 65° C. for 8 hours. An average capsule size of 16.4 μm was obtained as analyzed by a Model 780 Accusizer.

EXAMPLE 9

Preparation of Microcapsules Containing 5% Activator in Internal Phase

The composition of and the procedures for preparing the microcapsules are the same as in Example 7 except for the following:

| 1st Water Phase: | Deionized water, | 112 g |
| | Acrylic acid butyl acrylate copolymer, | 9.1 g |
| | 5% NaOH aqueous solution | 14.1 g |
| | methoxymethyl methylol melamine | 2.9 g |
| 2nd Water Phase | Deionized water | 33.0 g |
| | Polyacrylic acid | 6.1 g |
| | Methoxymethyl methylol melamine | 8.8 g |

EXAMPLE 10

Preparation of Microcapsules Containing Only Activator in Internal Phase

| Internal Phase: | PDHP (3,5-diethyl-1,2-dihydro-1-phenyl-2-pyropyl pyridine) | 290 g |
| Water Phase I | water | 230.4 g |
| | Acrylic acid butyl acrylate copolymer | 3.0 g |
| | 5% NaOH | 22.1 |
| | methoxymethyl methylol melamine | 4.8 g |
| Water Phase II | water | 126 g |
| | Polyacrylic acid | 10.1 g |
| | Methoxymethyl methylol melamine | 29.5 g |

A general procedure of capsule manufacture is described. 290 grams of 3,5-diethyl-1,2-dihydro-1-phenyl-2-pyropyl pyridine (PDHP) is selected as an internal phase.

A first water phase is prepared of 230.4 grams water 3 grams of acrylic acid butylacrylate copolymer, and 4.8 grams methoxymethyl methylol melamine. pH is adjusted to 5.68 with 5% NaOH.

A second water phase is prepared of 126 grams of water, 10.1 grams polyacrylic acid, and 29.5 grams methoxymethyl methylol melamine.

Water phase I is maintained at 65° C. with stirring (500 rpms). The internal phase is added and stirring increased to blend at high speed to achieve an emulsion size of 27.1 μm.

The second water phase is added along with 3.8 grams $Na_2SO_4$ and the mixture heated for 8 hours at 65° C. Capsules of approximately 26 μm. size are obtained.

EXAMPLE 11

Adhesive Coating Formulation

Capsules containing initiator and capsules containing activator were mixed with catalyst and binders, and were coated on a cellulosic substrate made of high density fiber boards. Alternatively catalyst may be pre-applied on the substrate, mixed in the liquid coating formulation, or applied in both. The binder used was a vinyl acetate-ethylene copolymer latex. After the coating was dried, two pieces of substrate with the coating applied using a snap-fit tongue and groove assembly were mated together, and the compression fit exerted sufficient shear force to break the capsules in the coating, resulting in reactive contact among initiator, activator, monomers and catalyst. Table 4 shows the bonding strength tested with an EJA Materials Tester (Thwin-Albert Company).

TABLE 4

Bonding strength with different adhesive formulations

| Test # | Initiator Capsules | Activator Capsules | Capsule Ratio of Initiator to Activator | Binder (%) | Copper pre-coat | Copper in slurry (ppm) | Strength (N) |
|---|---|---|---|---|---|---|---|
| 1 | Example 1 | Example 7 | 1/1 | 0 | Yes | 740 | 0 |
| 2 | Example 1 | Example 7 | 1/1 | 0 | Yes | 1480 | 0 |
| 3 | Example 1 | Example 7 | 1/1 | 5 | Yes | 740 | 89 |
| 4 | Example 1 | Example 7 | 1/1 | 5 | Yes | 1480 | 519 |
| 5 | Example 1 | Example 7 | 1/1 | 5 | No | 4400 | 510 |
| 6 | Example 4 | Example 9 | 1/1 | 0 | Yes | 1480 | 396 |
| 7 | Example 4 | Example 9 | 1/1 | 5 | Yes | 1480 | 670 |
| 8 | Example 1 | Example 6 | 1/2 | 0 | No | 1480 | 0 |
| 9 | Example 1 | Example 6 | 1/2 | 0 | Yes | 1480 | 869 |
| 10 | Example 1 | Example 6 | 1/2 | 5 | Yes | 1480 | 921 |
| 11 | Example 1 | Example 8 | 1/99 | 5 | Yes | 1480 | 719 |
| 12 | Example 1 | Example 8 | 5/95 | 5 | Yes | 1480 | 284 |
| 13 | Example 1 | Example 8 | 10/90 | 5 | Yes | 1480 | 191 |
| 14 | Example 2 | Example 8 | 1/99 | 5 | Yes | 1480 | 633 |
| 15 | Example 3 | Example 8 | 1/99 | 5 | Yes | 1480 | 636 |
| 16 | Example 5 | Example 10 | 1/99 | 5 | No | 4400 | 950 |

EXAMPLE 12

Initiator and Activator Capsules Coated on Separate Substrates

Capsules containing initiator and capsules containing activator may be separately formulated with other coating components, such as catalyst and binders. In the following table, these were coated on separate substrates to be bonded. Table 5 shows bonding strength tested with an EJA Materials Tester (Thwin-Albert Company).

TABLE 5

Bonding strength for capsules coated on separate substrates

| Test # | Initiator Capsules | Activator Capsules | Capsule Ratio of Initiator to Activator | Binder (%) | Copper pre-coat | Copper in slurry (ppm) | Strength (N) (Newtons) |
|---|---|---|---|---|---|---|---|
| 1 | Example 1 | Example 7 | 1/1 | 0 | Yes | 1480 | 156 |
| 2 | Example 1 | Example 7 | 1/1 | 5 | Yes | 1480 | 442 |
| 3 | Example 1 | Example 6 | 1/2 | 0 | Yes | 1480 | 772 |
| 4 | Example 1 | Example 6 | 1/2 | 5 | Yes | 1480 | 961 |
| 5 | Example 1 | Example 8 | 1/99 | 5 | Yes | 1480 | 896 |
| 6 | Example 5 | Example 10 | 1/99 | 5 | No | 4400 | 966 |

EXAMPLE 13

Different Binders

Many different kinds of binder materials can be used in the coating formulation. They should be able to hold capsules and other components of the coating in place, and has no adverse effect on bonding strength. The following binders were tested:
A—Vinyl acetate-ethylene copolymer
B—Acrylic latex
C—Carboxylated vinyl acetate resin
D—Polyvinyl acetate

TABLE 6

Bonding strength with different binders

| Binders | Initiator Capsules | Activator Capsules | Capsule Ratio of Initiator to Activator | Binder (%) | Copper pre-coat | Copper in slurry (ppm) | Strength (N) |
|---|---|---|---|---|---|---|---|
| A | Example 1 | Example 7 | 1/1 | 5 | Yes | 1480 | 790 |
| B | Example 1 | Example 7 | 1/1 | 5 | Yes | 1480 | 595 |
| C | Example 1 | Example 7 | 1/1 | 5 | Yes | 1480 | 775 |
| D | Example 1 | Example 7 | 1/1 | 5 | Yes | 1480 | 560 |

EXAMPLE 14

Viscosity of monomer blends as the internal phase of capsules. M corresponds to THFA/HDDMA 50/50 ratio

| Monomers in the internal phase | Viscosity (cps. 25° C.) Brookfield model LVF, spindle 2, 60 rpm |
|---|---|
| Melamine acrylate oligomer (Doresco UV75° C., 1500 cps)/M 50/50 ratio | Approx. 15 |
| Bisphenol A base epoxy acrylate (CN120, 2150 cps @ 65° C.)/M 40/60 ratio | Approx. 25 |
| Urethane dimethacrylate (CN 1963, 1740 cps@65° C.)/M 50/50 ratio | Approx. 53 |
| Polybutadiene (Ricon 130, 750 cps)/M 50/50 ratio | Approx. 25 |

The above blends can contain up to 5% by weight of DPC activator or CHP initiator. HDDMA is hexanediol dimethacrylate. THFA is tetrahydrofurfuryl methacrylate.

CN polymers and Ricon™ are trademarks of Sartomer (Exton, Pa.). Doresco™ is a trademark of Lubrizol (Wickliffe, Ohio). CHP is cumene hydroperoxide; DPC is diphenyl carbazone; CN120 is bisphenol epoxy acrylate.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes can be made by those skilled in the art without departing from the spirit and scope of the invention.

What is claimed is:

1. An encapsulated curable adhesive composition comprising:
   a) a two part curative, comprising a first-part curative comprising a free radical initiator and a second-part curative,
   b) a first population of polymeric microcapsules encasing both a monomer and the first-part curative forming a monomer and free radical initiator blend, the monomer being reactive with the second part curative, the first population of polymeric microcapsules being substantially impermeable to both parts of the curative, the monomer being a mixture of a first monomer component having a viscosity greater than 500 milliPascal-second selected from the group consisting of 50 parts of melamine acrylate, 40 parts of epoxy acrylate, 50 parts of urethane dimethacrylate and 50 parts of polybutadiene; and a second monomer component being the balance to make 100 parts by weight of monomer, the second monomer component being a 50/50 ratio by weight of a blend of hexane diol dimethacrylate and tetrahydrofurfuryl methacrylate, wherein the viscosity of the mixture of the first monomer component and the second monomer component is less than 500 milliPascal-second, wherein the monomer and the free radical initiator blend has a viscosity of a free flowing liquid of less than 500 milliPascal-second at 25° C., c) the second-part curative comprising a catalyst and an activator, the second-part curative being external to the first population of microcapsules and wherein the activator of the second-part curative is separately encapsulated forming a second population of polymeric microcapsules.

2. The adhesive according to claim 1 wherein the encapsulated monomer and initiator blend has a viscosity of a flowing liquid of 25 Centipoise or less.

3. The encapsulated curable adhesive according to claim 1 wherein the catalyst is selected from the group consisting of a transition metal, a transition metal salt and an organic acid.

4. The encapsulated adhesive according to claim 3 Wherein the catalyst is selected from the group consisting of a copper salt and an organo copper compound.

5. The encapsulated adhesive according to claim 1 wherein the activator is an organonitrogen compound.

6. The encapsulated adhesive according to claim 5 wherein the activator is selected from the group consisting of diphenyl carbazine, diphenyl carbazone, propyl dihydropyridine, and diethyl-1,2-dihydro-1-phenyl-2-propyl pyridine.

7. The encapsulated adhesive according to claim 1 further comprising a binder for the first population of microcapsules and the second-part curative.

8. The encapsulated adhesive according to claim 1 wherein the initiator is a peroxy initiator.

9. The encapsulated curable adhesive according to claim 1 further comprising one or more binder materials in which the microcapsules, and second-part curative are dispersed.

10. The encapsulated curable adhesive according to claim 9 wherein the binder material is UV curable, and includes a UV initiator.

11. A coated substrate with a preapplied encapsulated curable adhesive composition comprising a substrate and one or more layers of an encapsulated curable adhesive composition, wherein the encapsulated curable adhesive composition comprises:

a) a two part curative, comprising a first-part curative comprising a free radical initiator and a second-part curative, b) a first population of polymeric microcapsules encasing both a monomer and the first-part curative forming a monomer and free radical initiator blend, the monomer being reactive with the second part curative, the first population of polymeric microcapsules being substantially impermeable to both parts of the curative, the monomer being a mixture of a first monomer component having a viscosity greater than 500 milliPascal-second selected from the group consisting of 50 parts of melamine acrylate, 40 parts of epoxy acrylate, 50 parts of urethane dimethacrylate and 50 parts of polybutadiene; and a second monomer component being the balance to make 100 parts by weight of monomer, the second monomer component being a 50/50 ratio by weight of a blend of hexane diol dimethacrylate and tetrahydrofurfuryl methacrylate, wherein the viscosity of the mixture of the first monomer component and the second monomer component is less than 500 milliPascal-second, wherein the monomer and the free radical initiator blend has a viscosity of a free flowing liquid of less than 500 milliPascal-second at 25° C., c) the second-part curative comprising a catalyst and an activator, the second-part curative being external to the first population of microcapsules and wherein the activator of the second-part curative is separately encapsulated forming a second population of polymeric microcapsules.

12. Coated substrate with adhesive composition according to claim 11 wherein the binder layers comprise at least three layers, with a first binder layer having dispersed therein at least the first population of microcapsules, with a second binder layer having dispersed therein one or more of activator, catalyst or the second population of microcapsules, with a third binder layer having dispersed therein one or more of activator or catalyst, wherein the binder layers have the same or different binders.

13. Coated substrate with adhesive composition according to claim 12 wherein at least two of the binder layers are each individually applied to one or more surfaces of substrates intended to be adhered, and the third binder layer is applied as an overcoat layer over either of the first two binder layers.

14. Coated substrate with adhesive according to claim 11 wherein the monomer and initiator blend has a viscosity of a flowing liquid of 25 milliPascal-second or less.

15. Coated substrate with adhesive according to claim 11 wherein the catalyst is selected from the group consisting of a transition metal, transition metal salt, and organic acid.

16. Coated substrate with adhesive according to claim 15 wherein the catalyst is selected from the group consisting of a copper salt and an organo copper compound.

17. Coated substrate with adhesive according to claim 11 wherein the activator is an organonitrogen compound.

18. Coated substrate with adhesive according to claim 17 wherein the activator is selected from the group consisting of diphenyl carbazine, diphenyl carbazone, propyl dihydropyridine and 3,5-diethyl-1,2-dihydro-1-phenyl-2-pyropyl pyridine.

19. Coated substrate with adhesive according to claim 11 wherein the initiator is a peroxy initiator.

20. Coated substrate with adhesive according to claim 11 further comprising one or more binder materials in which the microcapsules, and second-part curative are dispersed.

21. The encapsulated curable adhesive according to claim 11 wherein the binder is UV curable, and includes a UV initiator.

* * * * *